US011392592B2

(12) United States Patent
Tacchelli et al.

(10) Patent No.: US 11,392,592 B2
(45) Date of Patent: Jul. 19, 2022

(54) METHOD FOR EFFICIENT BACKEND EVALUATION OF AGGREGATES ON COMPOSITE RELATIONSHIPS IN A RELATIONALLY MAPPED ER MODEL

(71) Applicant: SINDICE LIMITED, Galway (IE)

(72) Inventors: Fabio Tacchelli, Trento (IT); Giovanni Tummarello, Galway (IT); Renaud Delbru, Gradignan (FR)

(73) Assignee: SINDICE LIMITED, Galway (IE)

( * ) Notice: Subject to any disclaimer, the term of this patent is extended or adjusted under 35 U.S.C. 154(b) by 436 days.

(21) Appl. No.: 16/674,737

(22) Filed: Nov. 5, 2019

(65) Prior Publication Data

US 2020/0142899 A1    May 7, 2020

(30) Foreign Application Priority Data

Nov. 5, 2018    (IE) .................................. S2018/0382

(51) Int. Cl.

| | |
|---|---|
| *G06F 16/2457* | (2019.01) |
| *G06F 16/22* | (2019.01) |
| *G06F 16/28* | (2019.01) |
| *G06F 16/25* | (2019.01) |
| *G06F 16/9035* | (2019.01) |
| *G06F 16/242* | (2019.01) |
| *G06F 16/2455* | (2019.01) |

(52) U.S. Cl.
CPC .... *G06F 16/24578* (2019.01); *G06F 16/2282* (2019.01); *G06F 16/244* (2019.01); *G06F 16/2456* (2019.01); *G06F 16/25* (2019.01); *G06F 16/288* (2019.01); *G06F 16/9035* (2019.01)

(58) Field of Classification Search
CPC .......... G06F 16/24578; G06F 16/2282; G06F 16/244; G06F 16/2456; G06F 16/25; G06F 16/288; G06F 16/9035; G06F 16/24556
USPC .......................................................... 707/723
See application file for complete search history.

(56) References Cited

U.S. PATENT DOCUMENTS

| | | | |
|---|---|---|---|
| 2008/0228697 A1* | 9/2008 | Adya ..................... G06F 16/212 |
| 2012/0215810 A1* | 8/2012 | Evans ............... G06F 16/24556 |
| | | | 707/E17.014 |

(Continued)

*Primary Examiner* — Hicham Skhoun
(74) *Attorney, Agent, or Firm* — Whiteford, Taylor & Preston, LLP; Gregory M. Stone

(57) ABSTRACT

A computer-implemented method is disclosed for executing aggregate queries of composite relationships from an Entity-Relationship (ER) model which sources data from a plurality of heterogeneous and decentralised databases. The method comprises maintaining an ER model comprising a plurality of entities $E_n$ for which data exists in one or more databases, and one or more relationships $r_n$ between those entities. An aggregate query is received relating to a composite relationship cr(r1, r2) involving entities E1, E2 and E3 wherein r1 is a relation between E1 and E2, and wherein r2 is a relation between E2 and E3. The computation of the aggregate query is optimized by selecting an aggregation strategy according to the relation between entities E1, E2 and E3, such that a single table aggregation strategy, a semi-join strategy or a join strategy is selected according to the relation between tables defining entities in the ER model.

13 Claims, 3 Drawing Sheets

(56) References Cited

U.S. PATENT DOCUMENTS

| | | | |
|---|---|---|---|
| 2014/0324882 A1* | 10/2014 | Giovanni | G06F 16/2246 707/742 |
| 2015/0220601 A1* | 8/2015 | Leyba | G06F 16/2456 707/706 |
| 2016/0055233 A1* | 2/2016 | Wang | G06F 16/288 707/756 |
| 2019/0220464 A1* | 7/2019 | Butani | G06F 16/24542 |

* cited by examiner

METHOD FOR EFFICIENT BACKEND EVALUATION OF AGGREGATES ON COMPOSITE RELATIONSHIPS IN A RELATIONALLY MAPPED ER MODEL

CROSS-REFERENCE TO RELATED APPLICATION

This application claims the benefit of Irish Patent Application No. S2018/0382 titled "METHOD FOR EFFICIENT BACKEND EVALUATION OF AGGREGATES ON COMPOSITE RELATIONSHIPS IN A RELATIONALLY MAPPED ER MODEL," filed Nov. 5, 2018 by the inventors herein, which application is incorporated herein by reference in its entirety.

FIELD OF THE INVENTION

The present disclosure relates to the field of databases, and in particular the evaluation of aggregate operations of relationships in an Entity-Relationship (ER) model across multiple heterogeneous and decentralized databases.

BACKGROUND

In an Entity-Relationship (ER) model, information is organized around the concepts of entities with attributes and relationships. An entity can describe any concept in the real world such as a person, a company, an event, and so on. An entity can have multiple types of keys, such as composite, primary, foreign, etc. An entity is usually uniquely identified with a primary key. An entity can have multiple types of attributes, such as simple, composite, derived, etc. An attribute is used to describe an aspect of the entity. An attribute can be either single- or multi-valued. An entity can have multiple types of relationships, such as one-to-one, one-to-many, recursive, etc. A relationship is used to describe an association among entities. An ER model is a flexible abstract data model that can be used to map various complex data systems such as data in relational, graph, RDF or NoSQL databases.

Data analytics on large quantities of data has received a great amount of interest recently. Summaries of the data are needed to help humans in exploring and understanding large quantities of data. This is usually performed by executing aggregate operations on one or more dimensions of the data, e.g., summing the number of unique values in a given entity attribute, computing average of the values in a given entity attribute, etc. These aggregate operations can be pushed to the underlying database systems (for example, by using the GROUP BY clause in SQL), or they can be computed on the client side. The results of these aggregate operations can then be displayed to the user in the form of tables, visual charts, etc.

Given the graph-oriented aspect of the ER model, another possible aggregation type is the aggregation of relations between entities. This is useful when the ER model is large and complex in order to reduce the graph data to a more meaningful subset and avoid information overload. For example, instead of displaying all relations between two entities, relations can be grouped using one or more dimensions into one single relation with aggregation metadata. The aggregation metadata could then be the number of unique relations that this aggregate relation covers, or the average of a metadata attribute of those relations, and so on. Such graph summaries can also be used in other scenarios, such as predictive analytics, graph analytics (using algorithms such as, but not limited to, PageRank, the "travelling salesman problem", connectivity), and so on.

SUMMARY OF THE INVENTION

The present disclosure pertains to an information system where the user is presented with an ER model (comprised of entities and relationships) which is mapped to data which may be located in one or more heterogeneous and decentralized databases. For example, this can be a relational database comprised of tables having fields which may represent primary and foreign keys to each other, or a graph database comprised of nodes representing entities that are linked with edges representing relationships between those entities.

The user is interested in obtaining a summary of "composite relationships" between two entities by grouping "intermediate" entities for analytical purposes. However, the number of possible relationships is a combinatorial problem and can quickly become very large even with a small number of entity types. In addition, the user must have a good knowledge of the schema and of the data in order to choose a composite relationship that is meaningful to aggregate. This makes the task of selecting good candidates for composite relationships difficult for a user. The present disclosure tackles this problem by proposing a method to evaluate and filter out composite relationships that are not relevant and to recommend a smaller list of candidates to the user. The present disclosure also enables the query planner of a federated database system (this type of database system will be described shortly) to optimize the query processing by automatically selecting the best strategy for aggregating composite relationships based on the capabilities of the underlying database systems.

Disclosed is a method for executing aggregate queries of composite relationships from an ER model that sources data from a plurality of heterogeneous and decentralized databases. It is assumed that a federated database system is coordinating the query processing across multiple heterogeneous and decentralized databases. It is also assumed that the federated database system is storing an ER model mapping data from the plurality of heterogeneous and decentralized databases.

A federated database system is a system that integrates multiple independent and decentralized database systems into a single virtual federated database providing a uniform data access across all the database systems. The federated database system can augment the capabilities of the data access operations, for example by allowing joins between data tables across decentralized database systems. The federated database system usually includes a query planner to evaluate and optimize the execution of queries across the underlying database systems; for example, by pushing down data operations such as aggregations or joins to the database system when possible. The federated database system also provides a uniform access to schema information, and in this case to an ER model which is mapped to the data located in each of the decentralized database systems.

There is provided a computer-implemented method for executing aggregate queries of composite relationships from an Entity-Relationship (ER) model which sources data from a plurality of heterogeneous and decentralized databases, comprising the steps of:
   a. maintaining an ER model comprising a plurality of entities $E_n$ for which data exists in one or more databases, and one or more relationships $r_n$ between those entities;

b. receiving an aggregate query relating to a composite relationship cr(r1, r2) involving entities E1, E2 and E3 wherein r1 is a relation between E1 and E2, and wherein r2 is a relation between E2 and E3;

c. optimizing the computation of the aggregate query by selecting an aggregation strategy according to the relation between entities E1, E2 and E3, such that:

i. if all entities E1, E2 and E3 are defined in tables of a common database system supporting join and aggregate operations, selecting a join strategy defining a join operation between the tables containing E1, E2 and E3 and aggregating the join results based on one dimension of E2;

ii. if entities E1 and E3 are each mapped to foreign key attributes of E2, selecting a single table aggregation strategy defining a regular aggregation of entities E2;

iii. if the entity E2 is mapped to a foreign key attribute in both entities E1 and E3, selecting a semi-join aggregation strategy defining a semi-join operation between tables containing E1 and E3, and filtering records from E3 using record identifiers of E2 from the foreign key attribute of E1; and iv. if the entity E3 is mapped to a foreign key attribute of entity E2, selecting a semi-join aggregation strategy defining a semi-join operation between tables containing E1 and E2, and a regular aggregation based on the foreign key attribute from E2 that is mapped to E3.

Preferably, the method further comprises generating said ER model by receiving metadata information about data and schema from said one or more databases and integrating it into an ER model, comprising one or more entity instances, and one or more relationships between those entity instances.

Preferably, the method further comprises generating a list of recommended composite relationships ranked by relevance and presenting said list to a user.

Preferably, generating said list of recommended composite relationships comprises ranking composite relationships, based on metadata stored in the ER model and on an estimation of their relation cardinality.

Preferably, the cardinality of a relationship r1 between two entities E1 and E2 is an average number of unique values for the attribute r1 in the relation <E1, r1, E2> across all entity instances of type E1, and wherein the estimation of the cardinality of a composite relationship comprises combining the cardinality of the individual relationships using the product operator ($\Pi$), such that card(<E1, r1, E2, r2, E3>)=$\Pi$(card(<E1, r1, E2>), card(E2, r2, E3>)).

Preferably, the method further comprises filtering out non-aggregatable composite relationships that do not bring additional information once aggregated, based on metadata stored in the ER model.

There is also provided a computer-implemented method for executing aggregate queries of composite relationships from an Entity-Relationship (ER) model which sources data from a plurality of heterogeneous and decentralized databases, comprising the steps of:

a. maintaining an ER model comprising a plurality of entities $E_n$ for which data exists in one or more databases, and one or more relationships $r_n$ between those entities;

b. generating a list of recommended composite relationships cr(r1, r2) involving entities E1, E2 and E3 wherein r1 is a relation between E1 and E2, and wherein r2 is a relation between E2 and E3, wherein said list is ranked by relevance;

c. presenting said list to a user;

d. receiving an aggregate query relating to a composite relationship in said list; and e. evaluating said aggregate query.

Preferably, generating said list of recommended composite relationships comprises ranking composite relationships, based on metadata stored in the ER model and on an estimation of their relation cardinality.

Preferably, the cardinality of a relationship r1 between two entities E1 and E2 is an average number of unique values for the attribute r1 in the relation <E1, r1, E2> across all entity instances of type E1, and wherein the estimation of the cardinality of a composite relationship comprises combining the cardinality of the individual relationships using the product operator ($\Pi$), such that card(<E1, r1, E2, r2, E3>)=$\Pi$(card(<E1, r1, E2>), card(E2, r2, E3>)).

Preferably, the method further comprises filtering out non-aggregatable composite relationships that do not bring additional information once aggregated, based on metadata stored in the ER model.

Preferably, evaluating said aggregate query comprises optimizing the computation of the aggregate query by selecting an aggregation strategy according to the relation between entities E1, E2 and E3, such that:

i. if all entities E1, E2 and E3 are defined in tables of a common database system supporting join and aggregate operations, selecting a join strategy defining a join operation between the tables containing E1, E2 and E3 and aggregating the join results based on one dimension of E2;

ii. if entities E1 and E3 are each mapped to foreign key attributes of E2, selecting a single table aggregation strategy defining a regular aggregation of entities E2;

iii. if the entity E2 is mapped to a foreign key attribute in both entities E1 and E3, selecting a semi-join aggregation strategy defining a semi-join operation between tables containing E1 and E3, and filtering records from E3 using record identifiers of E2 from the foreign key attribute of E1; and iv. if the entity E3 is mapped to a foreign key attribute of entity E2, selecting a semi-join aggregation strategy defining a semi-join operation between tables containing E1 and E2, and a regular aggregation based on the foreign key attribute from E2 that is mapped to E3.

There is also provided a computer program product for executing aggregate queries of composite relationships from an Entity-Relationship (ER) model which sources data from a plurality of heterogeneous and decentralized databases, the computer program product comprising instructions which when executed in a processor of a computer system cause said system to operate by:

a. maintaining an ER model comprising a plurality of entities $E_n$ for which data exists in one or more databases, and one or more relationships $r_n$ between those entities;

b. receiving an aggregate query relating to a composite relationship cr(r1, r2) involving entities E1, E2 and E3 wherein r1 is a relation between E1 and E2, and wherein r2 is a relation between E2 and E3;

c. optimizing the computation of the aggregate query by selecting an aggregation strategy according to the relation between entities E1, E2 and E3, such that:

i. if all entities E1, E2 and E3 are defined in tables of a common database system supporting join and aggregate operations, selecting a join strategy defining a join operation between the tables containing E1, E2 and E3 and aggregating the join results based on one dimension of E2;

ii. if entities E1 and E3 are each mapped to foreign key attributes of E2, selecting a single table aggregation strategy defining a regular aggregation of entities E2;

iii. if the entity E2 is mapped to a foreign key attribute in both entities E1 and E3, selecting a semi-join aggregation strategy defining a semi-join operation between tables containing E1 and E3, and filtering records from E3 using record identifiers of E2 from the foreign key attribute of E1; and iv. if the entity E3 is mapped to a foreign key attribute of entity E2, selecting a semi-join aggregation strategy defining a semi-join operation between tables containing E1 and E2, and a regular aggregation based on the foreign key attribute from E2 that is mapped to E3.

There is further provided a computer program product for executing aggregate queries of composite relationships from an Entity-Relationship (ER) model which sources data from a plurality of heterogeneous and decentralized databases, the computer program product comprising instructions which when executed in a processor of a computer system cause said system to operate by:

a. maintaining an ER model comprising a plurality of entities $E_n$ for which data exists in one or more databases, and one or more relationships $r_n$ between those entities;

b. generating a list of recommended composite relationships cr(r1, r2) involving entities E1, E2 and E3 wherein r1 is a relation between E1 and E2, and wherein r2 is a relation between E2 and E3, wherein said list is ranked by relevance;

c. presenting said list to a user;

d. receiving an aggregate query relating to a composite relationship in said list; and e. evaluating said aggregate query.

The present disclosure also provides a method for executing aggregate queries of composite relationships from an ER model that sources data from a plurality of heterogeneous and decentralized databases, comprising:

a. receiving metadata information about data and schema from one or more databases and integrating it into an ER model, comprising one or more entity instances, and one or more relationships between those entity instances b. recommending a list of composite relationships that are ranked by relevance, and c. optimizing the computation of the aggregate query based on the capabilities of the underlying database systems.

The recommendation of the composite relationships comprises:

a. filtering out non-aggregatable composite relationships that do not bring additional information once aggregated, based on metadata stored in the ER model.

b. ranking composite relationships, based on metadata stored in the ER model and on an estimation of their relation cardinality.

The query planner optimization for the computation of the aggregation of a composite relationship comprises:

a. an aggregation strategy and related conditions using graph traversal operations b. an aggregation strategy and related conditions using standard join operations c. an aggregation strategy and related conditions using semi-join operations d. an aggregation strategy and related conditions using a single table aggregation operation These and other features will be better understood with reference to the following figures, which are provided to assist in an understanding of the present teaching, by way of example only.

DETAILED DESCRIPTION OF THE PREFERRED EMBODIMENTS

Embodiments of the present disclosure will now be described with reference to some exemplary apparatus and systems described herein. It will be understood that the embodiments described are provided to assist in an understanding of the present disclosure and are not to be construed as limiting in any fashion. Furthermore, modules or elements that are described with reference to any one figure may be interchanged with those of other figures or other equivalent elements.

Example of Composite Relationship Aggregation System

Figure 1:
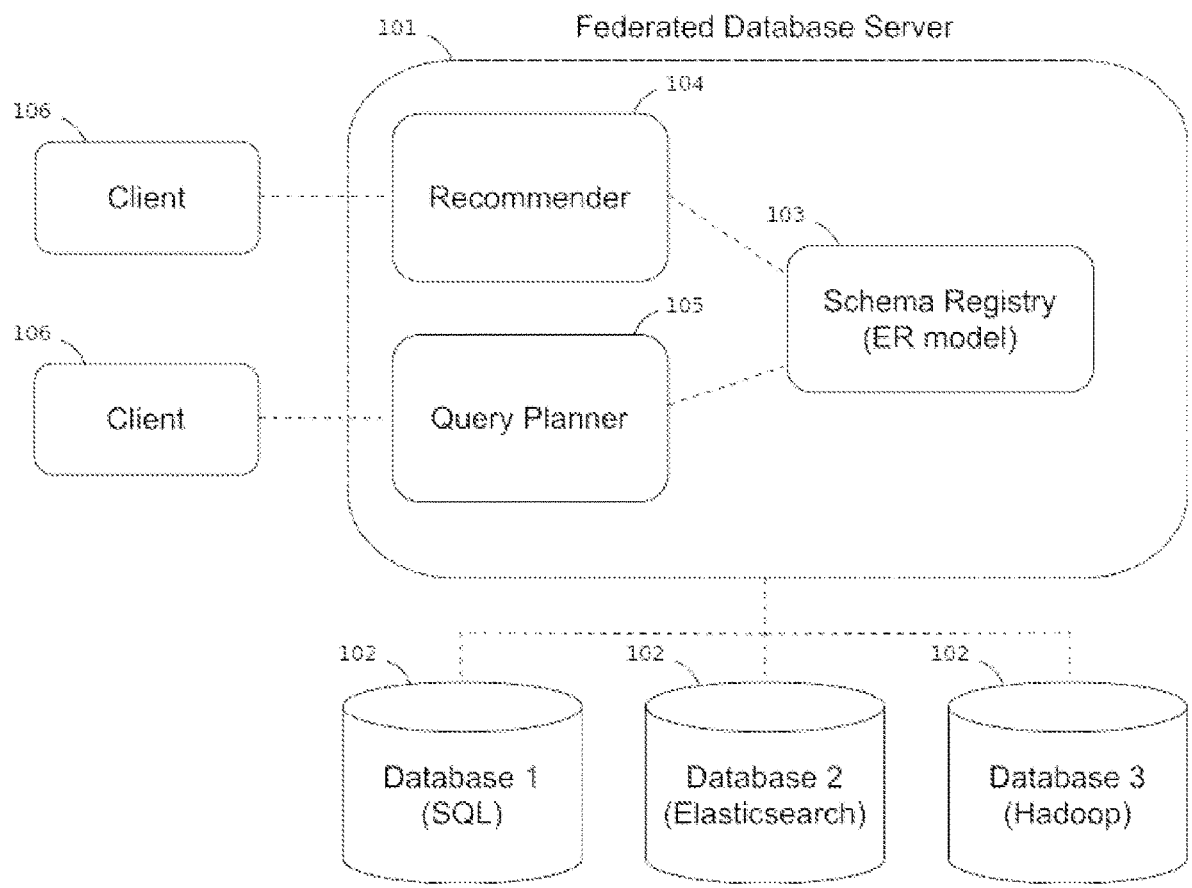
FIG. 1 illustrates an example of a composite relationship aggregation system.

FIG. 1 illustrates an example of a possible architecture for a federated database system aggregating composite relationships. The federated database system 101 is a process which comprises computer-readable program instructions to carry out aspects of the present disclosure. A federated database system may be interconnected to one or more database systems 102 by a network. Each database system, which can be (for example) a key-value store, a document store, a graph store, or a relational database, may have one or more data tables. The federated database system maintains a schema registry 103 of all the database systems, including an Entity-Relationship model across database systems, the schema metadata and statistics for each database, the capabilities of each database, and so on. The federated database system comprises a Recommender 104, carrying out the necessary functions to suggest relevant composite relationships for a given entity identifier, and a Query Planner 105, carrying out the necessary functions to compute aggregations of composite relationships.

A client 106 may interact with the federated database system by sending an entity type to the Recommender. The Recommender uses the schema registry to enumerate all the possible composite relationships for this entity type. Using information from the schema registry, the Recommender assigns a relevance score to each composite relationship, filters out non-aggregatable composite relationships, then sends a ranked list of composite relationships back to the client. A client 106 may interact with the federated database system by sending an entity identifier and a composite relationship to the Query Planner. The Query Planner uses the schema registry to evaluate the capabilities of the database systems and to select the optimal query execution strategy. Once the composite relationship has been evaluated and computed, the Query Planner sends the results back to the client.

The computer program product may include a computer-readable storage medium (or media) having computer-readable program instructions thereon for causing a processor to carry out aspects of the present disclosure. Examples of computer-readable storage media include, but are not limited to, magnetic media such as hard drives, floppy disks, and magnetic tape; optical media such as CD-ROMs and DVDs; and hardware devices such as ROM or RAM. Examples of computer-readable program instructions include machine instructions such as produced by a compiler and higher-level instructions that are interpreted by another computer program.

Example of Entity-Relationship Model

Figure 2:
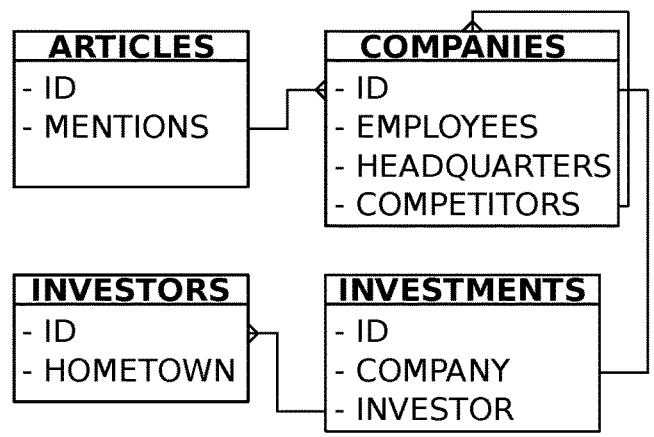
FIG. 2 illustrates an Entity Relationship (ER) model.

Taking as an example the relational data model illustrated in FIG. 2, the data model comprises multiple tables where each table may be stored in a different database system. The Articles table represents articles crawled (retrieved and indexed) from the Web and mentions one or more companies. In an embodiment, the Articles table may be stored in a NoSQL system such as Elasticsearch. The Companies table represents information about companies, such as their headquarters and the number of employees. A company may be competitor with one or more companies. The Investments table represents an investment round made by one or more investors and received by one (and only one) company. The Investors table represents information about investors such as their office location. In an embodiment, the Companies, Investments, and Investors tables may be stored in one or more relational database systems such as Oracle, PostgreSQL, MySQL, etc.

Figure 3:
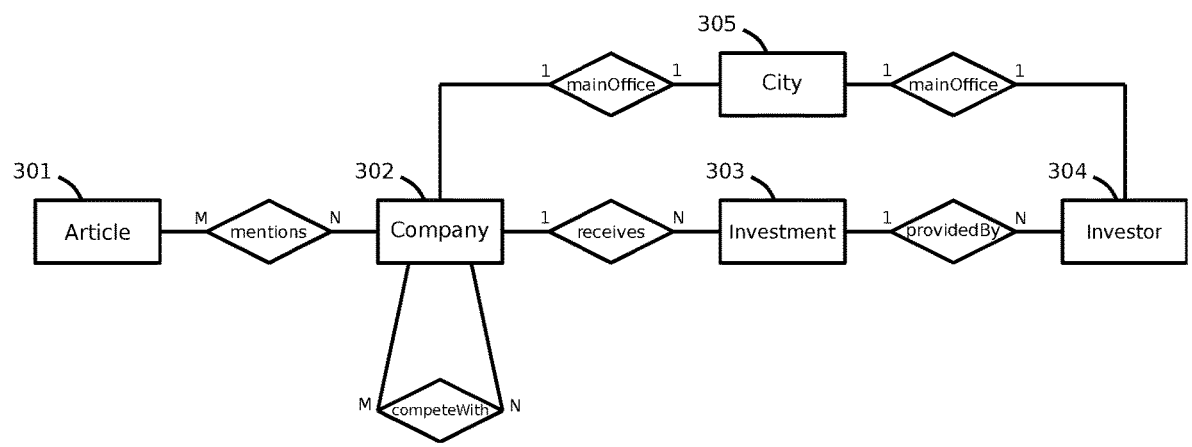
FIG. 3 illustrates information stored in relational tables and the mapping to the ER model in FIG. 1.

In an embodiment, the data model is mapped to an Entity Relationship model illustrated in FIG. 3. The ER model comprises an entity Article 301 which is mapped to the Articles table, an entity Company 302 which is mapped to the Companies table, an entity Investment 303 which is mapped to the Investments table, an entity Investor 304 which is mapped to the Investors table, and an entity City 305. It is to be noted that there is no database table related to City. This only means that the entity City is not mapped to a primary key of a database table but instead to two separate foreign key attributes, Companies.Headquarters and Investors.Hometown. Such an entity would not have any other attributes apart from its own identifier.

In FIG. 3, indicating explicitly inverse properties is omitted but it can be assumed that every property does have an inverse, e.g., "mentions" has an inverse property "mentioned" associated with it, which is semantically equivalent apart from the exchange of the subject with the object. In the present disclosure, the inverse property is referred to as "inverse(mentions)".

Composite Relationships

On an Entity-Relationship model like the one in FIG. 3, a composite relationship $cr(r1, r2)$ is a relationship between one entity (E1) and another (E3) composed of two relationships, <E1, r1, E2> where r1 is a relation between E1 and E2, and <E2, r2, E3> where r2 is a relation between E2 and E3.

Given an Entity-Relationship model, it is possible to list all the composite relationships by taking the entities one by one and enumerating the possible paths, keeping in mind that r1 and r2 can in fact be the inverse of each other, and E1, E2, and E3 can even refer to the same entity. The enumeration may yield a number that is quite high compared to the number of entities (there are 38 possible composite relationships in our simple example).

Filtering and Ranking Composite Relationships

When a client sends an entity type to the recommender, the recommender uses the schema registry to enumerate all possible composite relationships for this entity type. In some cases certain composite relationship will not bear any useful information. For example, the path between an entity instance $e1 \in E1$ and an entity instance $e3 \in E3$ may be unique or may not exist and therefore will not lead to any aggregatable relationships. To take another example, the composite relationship <Investments, inverse(receives), Companies, mainOffice, City> is trivial since there is always one company linked to an investment, and one city linked to a company. It may be necessary to avoid recommending these types of composite relationships to reduce the information overload on the user side.

The aggregability of a composite relationship <E1, r1, E2, r2, E3> may be estimated using the cardinality of its individual relationships. We define the cardinality of a relationship <E1, r1, E2>, as being the average number of unique values for the attribute r1 across all entity instances of type E1. This metric may be provided by the database system storing the table mapped to the entity E1, and if not may be computed by executing a query and then cached for later reuse. For example, the cardinality of a relationship <E1, r1, E2> may be computed using the following SQL query:

```
SELECT AVG(CARD)
FROM (
    SELECT COUNT(*) AS CARD
    FROM E1, E2
    WHERE
        E1.r1 = E2.ID
    GROUP BY E1.ID
);
```

Once the cardinality of the individual relationships have been computed, the recommender may estimate the cardinality of a composite relationship by combining the cardinality of the individual relationships using the product operator ($\Pi$), i.e., card(<E1, r1, E2, r2, E3>)=$\Pi$(card(<E1, r1, E2>), card(E2, r2, E3>)). When the cardinality estimation is less than or equal to 1, it is more likely that this composite relationship leads to a unique or a non-existing path between entity instances e1 and e3, and therefore the recommender may discard it from the results.

The recommender may rank the remaining composite relationships using the computed cardinality estimation. A composite relationship with a large cardinality estimation may be more relevant for the user as it may provide a way to aggregate larger sets of data.

Strategies for Aggregating Composite Relationships

When a client sends an entity identifier and a composite relationship to the query planner, the query planner uses the schema registry to map the entity types to their respective tables, then retrieves information about the capabilities of the database systems storing these tables. Depending on the capabilities of the database systems, the query planner may decide to use a different strategy for computing the aggregation of the composite relationship.

Graph Traversal Strategy

The standard aggregation strategy is based on a graph traversal method using database lookups. The lookup of an entity identifier is an operation that is supported by all database systems. Given an entity identifier e∈E1 and a composite relationship <E1, r1, E2, r2, E3>, the graph traversal is started by looking up the entity identifier e and by retrieving a set of entity identifiers E2'⊆E2 associated with the relation r1 of entity e. The graph traversal continues by looking up for every entity identifier e2∈E2' and by retrieving a set of entity identifiers E3'⊆E3 associated with the relation r2. The result is a set of paths, with each path defined by a list of entities <e1, e2, e3>. The aggregation operation is performed on the set of paths. For example, one may group all paths by the entity e3, then count the number of intermediate entities e2 associated with each group.

While this strategy is supported by all databases, this might generate many lookup requests to the underlying databases, and therefore this may be less efficient than other strategies which are explained next.

Join Strategy

The join strategy relies on joining the entity tables and aggregating the join results based on one dimension of the intermediate entity table. This strategy is possible when all the entity tables belong to the same database system and the database system supports join and aggregate operations.

For example, for a composite relationship <E1, r1, E2, r2, E3> and a starting record with identifier $ID, its cardinality aggregate may be computed using the following SQL query:

```
SELECT COUNT(*), E3.ID
FROM E1, E2, E3
WHERE
    E1.ID = $ID
    E1.r1 = E2.ID
    E2.r2 = E3.ID
GROUP BY E3.ID
ORDER BY COUNT(*) DESC
``` where $ID represents the identifier of the starting entity node.

Example: Articles Mentions Companies inv(securedBy) Investments

For this composite relationship, one could aggregate by the average number of people that are employed in companies connected to investments and a starting article with identifier A1. In this case the company identifier is a foreign key of the Investments table, and therefore the three tables must be joined.

```
SELECT INVESTMENTS.ID, AVG_EMPLOYEES
FROM ARTICLES, COMPANIES, INVESTMENTS
WHERE
    ARTICLES.ID = 'A1'
    ANY( ARTICLES.mentions ) = COMPANIES.ID
    COMPANIES.ID = INVESTMENTS.securedBy
GROUP BY INVESTMENTS.ID
ORDER BY AVG(COMPANIES.EMPLOYEES) AS
AVG_EMPLOYEES DESC
```

Semi-Join Strategy

The semi-join strategy relies on a semi-join between two tables as opposed to a standard join between three tables. This is usually more efficient to compute. In addition, this strategy may be implemented to join tables that are located in different database systems. For example, this may be implemented by fetching the list of record identifiers from the first table and by sending a SQL query to the second table using the SQL IN operator with the list of record identifiers.

There are two different conditions where the evaluation of a composite relationship can be reduced to a semi-join:

Condition 1

When the entity E3 is mapped to a foreign key attribute of the entity table E2 (such as City in the example), the strategy to aggregate the composite relationship is reduced to a single semi-join between tables E1 and E2. E1 is used to filter records from E2, and a regular aggregation is performed based on the foreign key attribute from E2 that is mapped to entity E3.

Example: Articles Mentions Companies mainOffice City

Given the article identifier A1 as starting point, this requires joining the Articles table with the Companies table on the Companies.ID key to filter the Companies table, then grouping by the foreign key attribute City.

```
SELECT COMPANIES.CITY, AVG_EMPLOYEES
FROM ARTICLES, COMPANIES
WHERE
    ARTICLES.ID = "A1"
    ANY( ARTICLES.mentions ) = COMPANIES.ID
GROUP BY COMPANIES.CITY
ORDER BY AVG(COMPANIES.EMPLOYEES) AS
AVG_EMPLOYEES DESC
```

Condition 2

When both the entities E1 and E3 have a foreign key attribute to E2 and when the aggregation is restricted to a count, then the strategy to aggregate the composite relationship may be reduced to a semi-join between table E1 and E3. Record identifiers of E2 from the foreign key attribute of E1 are used to filter records from E3.

Example: Articles Mentions Companies inv(securedBy) Investments

```
SELECT INVESTMENTS.ID, COUNT(*)
FROM ARTICLES, INVESTMENTS
WHERE
    ARTICLES.ID = "A1"
    ANY( ARTICLES.mentions ) = INVESTMENTS.securedBy
GROUP BY INVESTMENTS.ID
ORDER BY COUNT(*) DESC
```

Disjunctive Search Query Strategy

This strategy may be considered as a special case of the semi-join where the table E3 (the one being filtered) belongs to a database system with full-text search capabilities (such as Elasticsearch). In that case, the semi-join may be executed very efficiently using a disjunctive (OR) search query based on the record identifiers retrieved from the first table. The results are returned ranked by the number of "intermediate matches" (count of E2).

This is the case for the composite relationship <Articles, mentions, Companies, inv(mentions), Articles> which would return, given a starting article with id=1, the articles which have one or more mentioned companies in common, naturally ranked by the search engine based on the number of co-mentions.

Single Table Aggregation Strategy

This strategy is possible when the entities E1 and E3 are each mapped to foreign key attribute of E2 (either in the same attribute or in separate attributes).

This strategy does not require a join and is instead computed using a regular aggregation operation on entity table E2. This strategy is particularly useful since this operation is supported by most database backends.

Example: Companies inv(mentions) Articles Mentions Companies

In this example, the attribute Articles.mentions contains foreign keys to Companies. This attribute is used to filter the Articles table with the starting company identifier C1 and to group the co-mentioned companies.

```
SELECT CID, COUNT(*)
FROM (
    SELECT ARTICLES.ID, UNNEST(ARTICLES.mentions) AS CID
    FROM ARTICLES
    WHERE
        ANY( ARTICLES.mentions ) = 'C1'
)
GROUP BY CID
ORDER BY COUNT(*) DESC
```

Selecting the Aggregation Strategy

Figure 4:
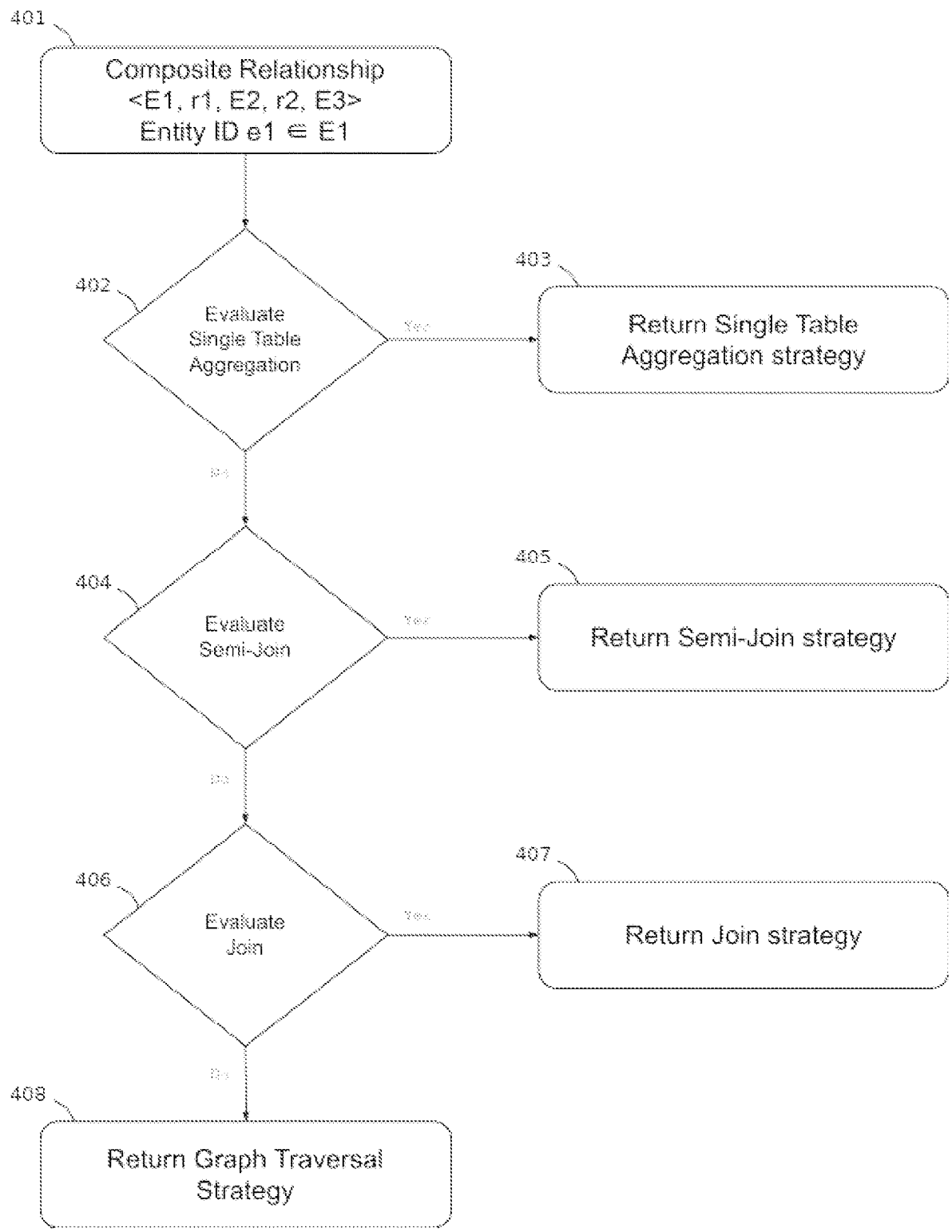
FIG. 4 illustrates a flowchart that describes method steps for evaluating a composite relationships.

Given the available strategies, the applicability conditions of each strategy, and the capabilities of each database system, the query planner of the database federation layer may evaluate before execution the optimal strategy for aggregating a composite relationship based on the capabilities of the database backends. FIG. 4 is a flowchart that describes method steps for selecting the optimal strategy to aggregate a composite relationship. In Step 401, the query planner is given a composite relationship and an entity identifier as input. Step 402 validates the conditions for the single table aggregation. If the validation is positive, the single table aggregation strategy is returned in Step 403. If the validation is negative, Step 404 is performed and validates the conditions for the semi-join strategy. If the validation is positive, the semi-join strategy is returned in Step 405. If the validation is negative, Step 406 is performed and validates the conditions for the join strategy. If the validation is positive, the join strategy is returned in Step 407. If the validation is negative, the graph traversal strategy is returned in Step 408.

CONCLUSION

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The present disclosure is not limited to the embodiment(s) described herein but can be amended or modified without departing from the scope of the present disclosure. Additionally, it will be appreciated that in embodiments of the present disclosure some of the above-described steps may be omitted and/or performed in an order other than that described.

Similarly the words comprises/comprising when used in the specification are used to specify the presence of stated features, integers, steps or components but do not preclude the presence or addition of one or more additional features, integers, steps, components or groups thereof.

What is claimed is:

1. A computer-implemented method for executing aggregate queries of composite relationships from an Entity-Relationship (ER) model which sources data from a plurality of heterogeneous and decentralised databases, comprising the steps of:
   a. maintaining an ER model comprising a plurality of entities $E_n$ for which data exists in one or more databases, and one or more relationships $r_n$ between those entities;
   b. receiving an aggregate query relating to a composite relationship $cr(r1, r2)$ involving entities E1, E2 and E3 wherein r1 is a relation between E1 and E2, and wherein r2 is a relation between E2 and E3;
   c. optimizing the computation of the aggregate query by selecting an aggregation strategy according to the relation between entities E1, E2 and E3, such that:
      i. if all entities E1, E2 and E3 are defined in tables of a common database system supporting join and aggregate operations, selecting a join strategy defining a join operation between the tables containing E1, E2 and E3 and aggregating the join results based on one dimension of E2;
      ii. if entities E1 and E3 are each mapped to foreign key attributes of E2, selecting a single table aggregation strategy defining a regular aggregation of entities E2;
      iii. if the entity E2 is mapped to a foreign key attribute in both entities E1 and E3, selecting a semi-join aggregation strategy defining a semi-join operation between tables containing E1 and E3, and filtering records from E3 using record identifiers of E2 from the foreign key attribute of E1; and
      iv. if the entity E3 is mapped to a foreign key attribute of entity E2, selecting a semi-join aggregation strategy defining a semi-join operation between tables containing E1 and E2, and a regular aggregation based on the foreign key attribute from E2 that is mapped to E3.

2. The method of claim 1, further comprising generating said ER model by receiving metadata information about data and schema from said one or more databases and integrating it into an ER model, comprising one or more entity instances, and one or more relationships between those entity instances.

3. The method of claim 1, further comprising generating a list of recommended composite relationships ranked by relevance and presenting said list to a user.

4. The method of claim 3, wherein generating said list of recommended composite relationships comprises ranking composite relationships, based on metadata stored in the ER model and on an estimation of their relation cardinality.

5. The method of claim 4, wherein the cardinality of a relationship r1 between two entities E1 and E2 is an average number of unique values for the attribute r1 in the relation <E1, r1, E2> across all entity instances of type E1, and wherein the estimation of the cardinality of a composite relationship comprises combining the cardinality of the individual relationships using the product operator ($\Pi$), such that $card(<E1, r1, E2, r2, E3>) = \Pi(card(<E1, r1, E2>), card(E2, r2, E3>))$.

6. The method of claim 4, further comprising filtering out non-aggregatable composite relationships that do not bring additional information once aggregated, based on metadata stored in the ER model.

7. A computer-implemented method for executing aggregate queries of composite relationships from an Entity-Relationship (ER) model which sources data from a plurality of heterogeneous and decentralised databases, comprising the steps of:
   a. maintaining an ER model comprising a plurality of entities $E_n$ for which data exists in one or more databases, and one or more relationships $r_n$ between those entities;
   b. generating a list of recommended composite relationships cr(r1, r2) involving entities E1, E2 and E3 wherein r1 is a relation between E1 and E2, and wherein r2 is a relation between E2 and E3, wherein said list is ranked by relevance;
   c. presenting said list to a user;
   d. receiving an aggregate query relating to a composite relationship in said list; and
   e. evaluating said aggregate query.

8. The method of claim 7, wherein generating said list of recommended composite relationships comprises ranking composite relationships, based on metadata stored in the ER model and on an estimation of their relation cardinality.

9. The method of claim 8, wherein the cardinality of a relationship r1 between two entities E1 and E2 is an average number of unique values for the attribute r1 in the relation <E1, r1, E2> across all entity instances of type E1, and wherein the estimation of the cardinality of a composite relationship comprises combining the cardinality of the individual relationships using the product operator ($\Pi$), such that card(<E1, r1, E2, r2, E3>)=$\Pi$(card(<E1, r1, E2>), card(E2, r2, E3>)).

10. The method of claim 7, further comprising filtering out non-aggregatable composite relationships that do not bring additional information once aggregated, based on metadata stored in the ER model.

11. The method of claim 7, wherein evaluating said aggregate query comprises optimizing the computation of the aggregate query by selecting an aggregation strategy according to the relation between entities E1, E2 and E3, such that:
   i. if all entities E1, E2 and E3 are defined in tables of a common database system supporting join and aggregate operations, selecting a join strategy defining a join operation between the tables containing E1, E2 and E3 and aggregating the join results based on one dimension of E2;
   ii. if entities E1 and E3 are each mapped to foreign key attributes of E2, selecting a single table aggregation strategy defining a regular aggregation of entities E2;
   iii. if the entity E2 is mapped to a foreign key attribute in both entities E1 and E3, selecting a semi-join aggregation strategy defining a semi-join operation between tables containing E1 and E3, and filtering records from E3 using record identifiers of E2 from the foreign key attribute of E1; and
   iv. if the entity E3 is mapped to a foreign key attribute of entity E2, selecting a semi-join aggregation strategy defining a semi-join operation between tables containing E1 and E2, and a regular aggregation based on the foreign key attribute from E2 that is mapped to E3.

12. A computer program product for executing aggregate queries of composite relationships from an Entity-Relationship (ER) model which sources data from a plurality of heterogeneous and decentralised databases, the computer program product comprising instructions which when executed in a processor of a computer system cause said system to operate by:
   a. maintaining an ER model comprising a plurality of entities $E_n$ for which data exists in one or more databases, and one or more relationships $r_n$ between those entities;
   b. receiving an aggregate query relating to a composite relationship cr(r1, r2) involving entities E1, E2 and E3 wherein r1 is a relation between E1 and E2, and wherein r2 is a relation between E2 and E3;
   c. optimizing the computation of the aggregate query by selecting an aggregation strategy according to the relation between entities E1, E2 and E3, such that:
      i. if all entities E1, E2 and E3 are defined in tables of a common database system supporting join and aggregate operations, selecting a join strategy defining a join operation between the tables containing E1, E2 and E3 and aggregating the join results based on one dimension of E2;
      ii. if entities E1 and E3 are each mapped to foreign key attributes of E2, selecting a single table aggregation strategy defining a regular aggregation of entities E2;
      iii. if the entity E2 is mapped to a foreign key attribute in both entities E1 and E3, selecting a semi-join aggregation strategy defining a semi-join operation between tables containing E1 and E3, and filtering records from E3 using record identifiers of E2 from the foreign key attribute of E1; and
      iv. if the entity E3 is mapped to a foreign key attribute of entity E2, selecting a semi-join aggregation strategy defining a semi-join operation between tables containing E1 and E2, and a regular aggregation based on the foreign key attribute from E2 that is mapped to E3.

13. A computer program product for executing aggregate queries of composite relationships from an Entity-Relationship (ER) model which sources data from a plurality of heterogeneous and decentralised databases, the computer program product comprising instructions which when executed in a processor of a computer system cause said system to operate by:
   a. maintaining an ER model comprising a plurality of entities $E_n$ for which data exists in one or more databases, and one or more relationships $r_n$ between those entities;
   b. generating a list of recommended composite relationships cr(r1, r2) involving entities E1, E2 and E3 wherein r1 is a relation between E1 and E2, and wherein r2 is a relation between E2 and E3, wherein said list is ranked by relevance;
   c. presenting said list to a user;
   d. receiving an aggregate query relating to a composite relationship in said list; and
   e. evaluating said aggregate query.

* * * * *